J. F. LAWTON.
Machine for Steaming Grain.
No. 44,322.
Patented Sept. 20, 1864.
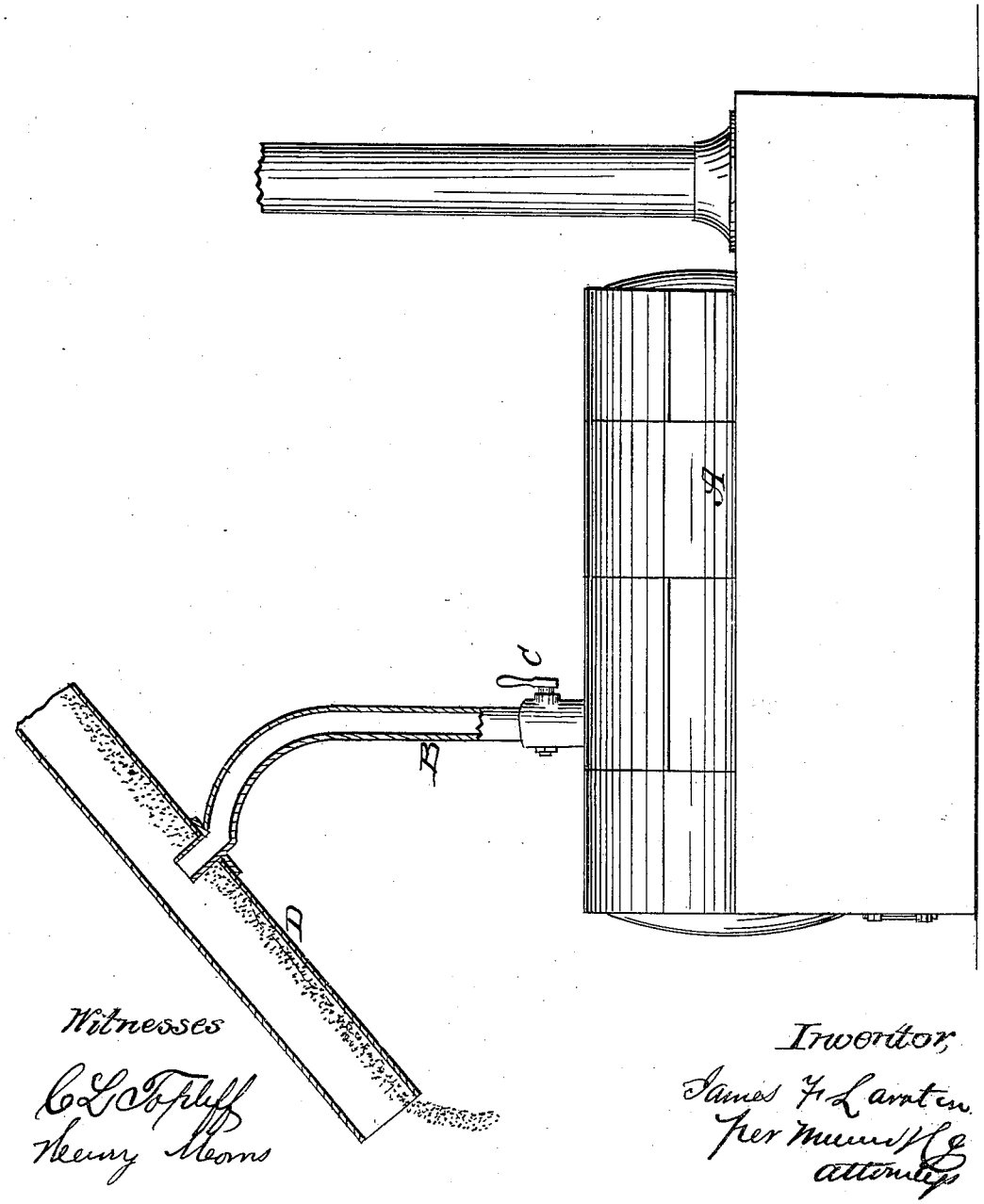

UNITED STATES PATENT OFFICE.

JAMES F. LAWTON, OF VENEDY, ILLINOIS.

IMPROVEMENT IN STEAMING GRAIN IN PROCESS OF GRINDING.

Specification forming part of Letters Patent No. 44,322, dated September 20, 1864.

*To all whom it may concern:*

Be it known that I, JAMES F. LAWTON, of Venedy, in the county of Washington and State of Illinois, have invented new and useful Improvements in Apparatus for Steaming Grain; and I do hereby declare that the following is a full, clear, and exact description thereof, which will enable others skilled in the art to make and use the same, reference being had to the accompanying drawing, forming part of this specification, said drawing representing the apparatus by which I carry out my invention.

A represents a steam-boiler with its furnace and chimney in side elevation, and B a steam-pipe connecting the boiler with a grain-spout, D, which parts are shown in section. C is a steam-cock to regulate the supply of steam.

It is well known that in the process of grinding wheat the burr suffers much injury, and is rapidly worn away by reason of the refractory and unyielding character of the cuticle of the berry, which in its ordinary condition, when considered to be ready for the miller, is hard and brittle, and offers great resistance to the burrs. It results from this that in reducing it in the mill much of the grain is fractured while the coating still adheres to the flour which it covers, and of course such fragments of the grain are reduced to flour, and the nutritious parts of the berry become thereby inseparably ground up with such portions of the coating, instead of the coating being torn and peeled off in a way to be afterward separated as bran. If, therefore, instead of drying the grain for the miller, it is dampened upon the outside so as to effect only the coating and not the flour of the berry, it will result that the coating will peel off in the earlier stages of the process of grinding and not be liable to be broken up like grits, and thus be ground up and mixed with the nutritious parts of the grain.

My invention consists in treating the grain with free steam while it is being delivered to the hopper of the mill, thereby making its coat tough, so as it will peel off under the pressure of the stones. The boiler should be so constructed as to prevent priming if steam is taken directly from the boiler, as in the drawing, as I do not design that water shall pass through the steam-pipe into the grain-spout. Waste steam may be used instead of steam direct from a boiler. I admit the steam into the spout at any convenient distance above the hopper, and not in such quantity as will injure the grain from the effects of the water of condensation.

In the illustration I have given of my invention the grain is shown in red in the spout D, and falling into the hopper while the steam is admitted to it and acts upon it in a spout constructed in the ordinary manner. This method of treating the grain enables me to obtain a greater yield of flour, a cleaner bran, better middling, and a superior quality of flour from the same grain than by the old treatment. Moreover, when grain is treated as I have shown, less power is needed to run the same stones.

I claim as new and desire to secure by Letters Patent—

Treating grain preparatory to grinding by subjecting it to immersion in an atmosphere of free steam, substantially as shown.

JAMES F. LAWTON.

Witnesses:
 HENRY MOELLMAN,
 F. W. BROCKSCHMIDT,
 J. F. BROCKSCHMIDT.